United States Patent
Goodwater et al.

[11] Patent Number: 6,154,959
[45] Date of Patent: Dec. 5, 2000

[54] LASER CLADDING A TURBINE ENGINE VANE PLATFORM

[75] Inventors: Frank Goodwater; David Kang, both of Reno, Nev.

[73] Assignee: Chromalloy Gas Turbine Corporation, San Antonio, Tex.

[21] Appl. No.: 09/375,124

[22] Filed: Aug. 16, 1999

[51] Int. Cl.⁷ .................................................. B23P 15/00
[52] U.S. Cl. .................. 29/889.1; 29/889.7; 228/119
[58] Field of Search ................. 29/889.1, 889.7, 29/402.07, 402.08, 402.05, 402.12; 228/119

[56] References Cited

U.S. PATENT DOCUMENTS

| | | | |
|---|---|---|---|
| 4,883,216 | 11/1989 | Patsfall | 228/119 |
| 5,197,190 | 3/1993 | Coolidge | 29/889.1 |
| 5,269,057 | 12/1993 | Mendham | 29/402.08 |
| 5,444,911 | 8/1995 | Goodwater et al. | 29/889.7 |
| 5,522,134 | 6/1996 | Rowe et al. | 29/889.1 |
| 5,554,837 | 9/1996 | Goodwater | 219/121.63 |
| 5,690,469 | 11/1997 | Deal et al. | 415/189 |
| 5,732,468 | 3/1998 | Galley et al. | 29/889.1 |
| 5,758,416 | 6/1998 | Reverman et al. | 29/889.1 |
| 5,813,832 | 9/1998 | Rasch et al. | 415/200 |

*Primary Examiner*—I Cuda Rosenbaum
*Attorney, Agent, or Firm*—Mitchell D. Bittman

[57] ABSTRACT

A method of refurbishing turbine engine vanes in which an alloy blend of a cobalt based superalloy and a nickel based superalloy corresponding to the base material of the turbine vane cobalt platform and the base nickel material of the replacement turbine vane airfoils is laser clad to the gaspath surfaces of the turbine vane platform. Laser cladding with the alloy blend allows the use of replacement airfoils with improved castings in the form of improved nickel based superalloys, and allows a coating to be uniformly applied to the gaspath surfaces of the vane. According to the method, the platforms are separated from the airfoils and laser clad with a blend of cobalt based superalloy and nickel based superalloy. The vane is then reassembled using the laser clad platform and at least one replacement airfoil.

25 Claims, 7 Drawing Sheets

LASER CLADDING A TURBINE ENGINE VANE PLATFORM

CROSS-REFERENCE TO RELATED APPLICATION

This application is related to U.S. patent application Ser. No. 09/373,277, entitled "Method for Replacing a Turbine Vane Airfoil," filed Aug. 12, 1999, the contents of which are incorporated herein by reference.

BACKGROUND OF THE INVENTION

The present invention relates to a method for refurbishing turbine vanes, and more particularly, to a method of refurbishing in which an alloy blend powder corresponding to the base cobalt material of the turbine vane platform and the base nickel material of the replacement turbine vane airfoils is laser clad to the gaspath surfaces of turbine vane platforms, thereby improving the mechanical and coating properties of the refurbished vane.

Components of gas turbine engines, especially those positioned within the hot section of the engine, are exposed to a harsh operating environment. Extreme operating temperatures, accompanied by repeated temperature cycling during engine warm-up, operation and cool-down can quickly deteriorate engine components. These components include HPT (high-pressure turbine) vane segments which can become damaged or worn such that they require repair, i.e., refurbishment, or replacement.

A turbine engine vane segment is typically comprised of an outer and inner platform, between which one or more airfoils are positioned. The airfoils are either cast as a single unit with one or both of the platforms or are separately welded or brazed to the platforms in the form of a component assembly. Some turbine vanes are complex castings, comprising two, three or more airfoils integrally cast to the inner and outer platforms. Another form of turbine vanes is paired assemblies. A paired assembly is a vane in which a single airfoil is integrally cast between two platforms. Two of these castings are brazed or welded along mate face joints to create a doublet vane assembly.

Conventional airfoil replacement procedures involve separating the platforms by cutting the airfoils therefrom. This procedure retains a stub on each platform where the airfoils are cut out. The replacement airfoils are then typically welded to the stubs using electron beam (EB) welding techniques. Because the new airfoils must be positioned on the existing stubs, the positioning of the new airfoils is restricted. It is also extremely difficult to EB weld nickel airfoils to cobalt platforms, or to even EB weld nickel airfoils to nickel platforms. Also, because airfoil stubs are retained, complete refurbishment of the platform gaspath surfaces by an automated process is not possible. The irregularly contoured stub protruding from each platform requires that brazing and contouring of the platforms be done by hand. It is desirable, however, to automate as many refurbishment operations as possible in order to minimize repair prices and time.

Airfoil positioning within the vane, i.e., location on the vane segment platform, might require adjustment during vane refurbishment. For example, an adjustment to the nozzle opening area between adjacent vanes (hereinafter the "class area") may be required. For example, advances in material science often provide improved materials for use as airfoil members, and may provide airfoils having sizes and aerodynamic properties which differ from those used in existing vanes.

Components in gas turbine engines are air cooled and are fabricated from expensive materials. These components are also costly to assemble. As a result, it is desired to be able to efficiently repair the damage, while providing for upgraded components and materials within each vane, such that as much of the original materials as possible can be reused.

The concept of improving a turbine vane assembly by upgrading the alloy from which it is cast is known in the industry. As the ability to cast more complicated shapes from advanced high strength alloys has improved, turbine engine manufacturers implement these alloys on vanes having new configurations.

For example, General Electric Corporation produced first stage turbine vanes for LM1600 engines using X40 (cobalt) airfoils mated to X40 platforms. These vanes were subsequently manufactured using MA754 (nickel) airfoils with Mar M 509 (cobalt) platforms. The current configuration LM1600 vane uses Rene N5 airfoils (single crystal nickel) with DS Rene 142 platforms (directionally solidified nickel).

Another example is General Electric F404 first stage turbine vanes. The original F404 vanes had MA754 airfoils mated to Mar M 509 platforms. The F404 vanes were subsequently manufactured using N5 airfoils with DSR142 platforms.

Directionally solidified precipitation hardening nickel-based superalloys exhibit superior mechanical properties when compared with typical equiax structure cobalt based superalloys or equiax nickel based superalloys. As such, they are a logical choice to be used as replacement airfoils during refurbishment of a turbine vane. Problems arise, however, when a nickel based superalloy vane is mated with a cobalt based superalloy platform. In the past, vanes which were manufactured with this configuration, such as LM1600 or F404 vanes, did not have the airfoil surfaces coated. However, current engine operating conditions are so severe that bare alloy cannot provide adequate service life. It is therefore essential that all gaspath surfaces of the turbine vanes receive a protective coating to prevent oxidation and corrosion.

The preferred coating is an aluminide or precious metal (platinum) aluminide that may be applied by diffusion, overlay, or other means. The surface chemistry of the gaspath surfaces of the platforms must be compatible with the airfoils in order to achieve uniform coating (microstructure and properties) on the entire vane assembly gaspath. A cobalt based superalloy platform will coat at a different rate than a nickel based superalloy airfoil causing a nonuniform coating, rendering the gaspath surfaces non-compatible for coating purposes.

It is possible to clad cobalt based superalloy platforms with a straight nickel based superalloy when the vane is being refurbished using nickel based superalloy airfoils. However, the differing coefficients of thermal expansion along with differing yield strengths between the nickel superalloy cladding and the cobalt superalloy substrate cause significant cracking problems during the repair process and also during subsequent engine operation.

It is desirable, therefore, to provide a cladding material which can be applied to the surface of a cobalt based superalloy vane platform during vane refurbishment so as to allow the use of nickel based superalloy airfoils and to improve the mechanical properties of the vane while minimizing vane cracking during refurbishment and engine operation, and which is compatible with the aluminide coating. It is further desirable to refurbish the vane such that subsequent refurbishment is simplified.

SUMMARY OF THE INVENTION

The present invention provides a method for refurbishing turbine engine vanes in which an alloy blend powder is laser clad to the gaspath surfaces of turbine vane cobalt platforms. The alloy blend is comprised of a mixture of a nickel based superalloy and a cobalt based superalloy.

Also, during refurbishment, the original configuration of the vanes may be modified from a single casting or welded pair to a multi-piece component assembly comprising individual airfoil segments attached to the inner and outer platforms. The component assembly allows replacement of airfoils and/or platforms with improved castings. Another configuration consists of a multiple component assembly where a new replacement platform is cast integrally with one or more airfoils, which is then attached to a repaired platform. The improvements can be in the form of improved alloys, improved physical geometry, or both. The method of the present invention also allows modifications to be made in the vane class area without the need to modify the airfoil contour by brazing or other contour alteration processes.

The laser cladding operation of the present invention improves the mechanical and hot corrosion properties of the platform gaspath surfaces as compared with merely brazing an equivalent alloy thereto, while making the chemical composition of the platform and airfoil gaspath surfaces sufficiently similar to one another such that a coating can be uniformly applied to these gaspath surfaces using conventional application methods. In addition, laser cladding, as opposed to brazing, facilitates subsequent vane repairs by reducing the dilution effects in the remaining original base alloy caused by the addition of melting point depressants into the braze composition.

The present invention therefore allows, for example, directionally solidified or single crystal replacement nickel based superalloy airfoils to be easily incorporated into the new vane assembly. The present invention reduces repair time and costs, and allows for component upgrade and vane performance optimization, while simultaneously extending the usable service life of the refurbished vane.

The present invention provides a method of refurbishing a turbine vane in which the turbine vane has at least one platform and at least one airfoil. According to the method, the platform is separated from the airfoil. The platform is comprised of a first cobalt based superalloy and a replacement airfoil is comprised of a first nickel based superalloy. The platform is laser clad with a blend of a second nickel based superalloy and a second cobalt based superalloy. In a preferred embodiment one or both of the first cobalt based superalloy is the same composition as the second cobalt based superalloy and the first nickel based superalloy is the same composition as the second nickel based superalloy. The vane is reassembled from the laser clad platform and the replacement airfoil.

The present invention also provides a method of repairing a turbine vane in which the turbine vane has at least one cobalt based superalloy platform and at least one nickel based superalloy airfoil. The platform has at least one opening. According to the method, the platform is separated from the airfoil. The gaspath surface on the platform is restored. The platform is laser clad with a blend of a cobalt based superalloy and a nickel based superalloy. An airfoil socket is cut into the platform. The vane is reassembled from the platform and the replacement airfoil, the replacement airfoil being coupled with the airfoil socket.

Also provided by the present invention is a method of repairing a turbine vane in which the turbine vane has at least one cobalt based superalloy platform and a plurality of nickel based superalloy airfoils. A distance between two of the plurality of airfoils defines a first class area and the platform has openings corresponding to a quantity of airfoils. According to the method, the platform is separated from the plurality of airfoils. The openings in the platform are sealed. The platform is laser clad with a blend of a cobalt based superalloy and a nickel based superalloy. A plurality of airfoil sockets are cut into the platform in which the plurality of airfoil sockets are cut at a location different from a corresponding opening. The vane is reassembled from the platform and the plurality of replacement airfoils in which each of the plurality of replacement airfoils are coupled with a respective airfoil socket.

Other features and advantages of the present invention will become apparent from the following description of the embodiments of the invention which refer to the accompanying drawings.

BRIEF DESCRIPTION OF THE DRAWINGS

FIG. 7 is a perspective view of vane platforms with new sockets cut through.

Figure 1:
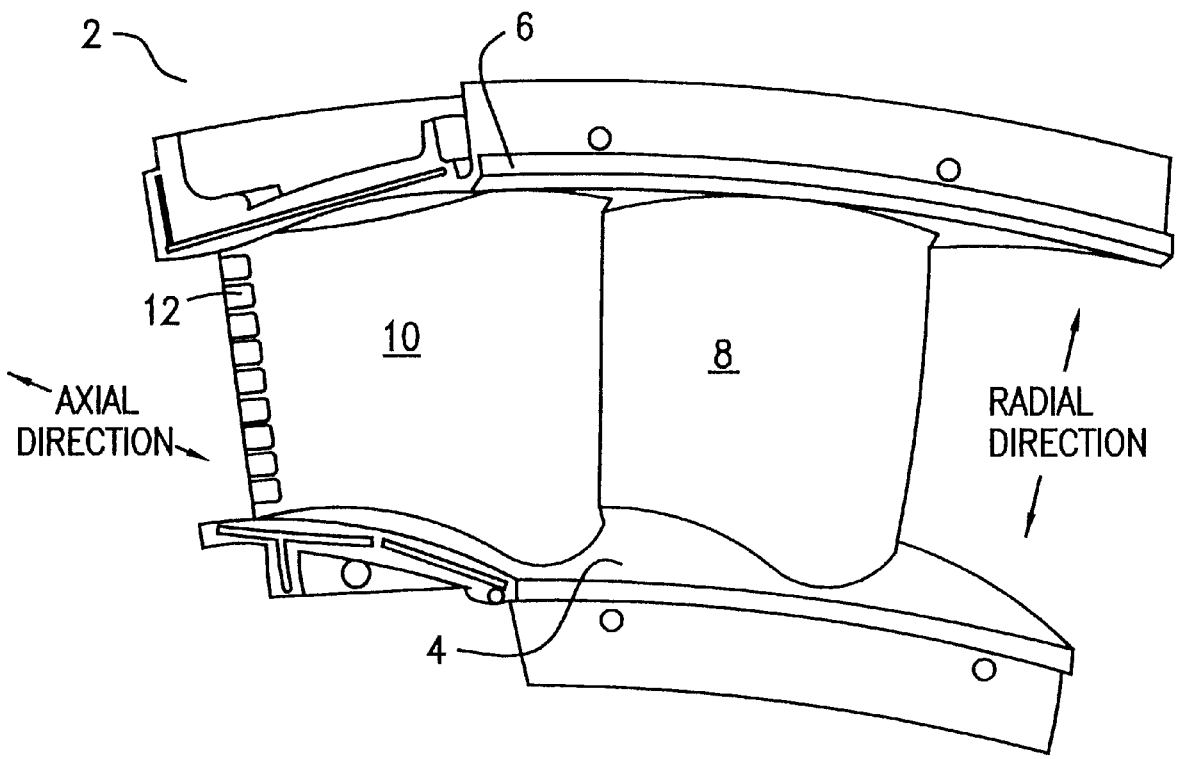
FIG. 1 is a perspective view of a turbine vane upon which the method of the present invention is performed.

For the purpose of illustrating the invention, there is shown in the drawings a form which is presently preferred, it being understood, however, that the invention is not limited to the precise arrangement and instrumentality shown.

DETAILED DESCRIPTION OF THE EMBODIMENTS OF THE INVENTION

Initially, it is noted that the terms "repair", "upgrade" and "refurbish" are used interchangeably herein to refer to the process of disassembling a turbine engine vane and replacing its airfoils.

Referring to the drawing figures which like reference numerals refer to like elements, FIG. 1 is a perspective view of a turbine vane upon which the method of the present invention is performed. Turbine vane 2 which will be repaired according to the method of the present invention is comprised of inner platform 4, outer platform 6, lead airfoil 8 and trailing airfoil 10. Prior to repair, lead airfoil 8 and trailing airfoil 10 are either cast as an integrated unit with one or both of inner platform 4 and outer platform 6, or are welded and/or brazed to one or both of inner platform 4 and outer platform 6. It should be noted that although FIG. 1 shows two airfoils, 8 and 10, a turbine vane can be comprised of any number of airfoils. Cooling slots 12 are positioned at the trailing edge of lead airfoil 8 and trailing airfoil 10.

For the purpose of describing the invention, an example is discussed in which the platforms were manufactured from X40 cobalt based superalloy and the upgraded replacement airfoils from CM186 nickel based superalloy. However, it should be noted that, as discussed below, the present invention can be applied to any cobalt based superalloy vane platform which is to be mated to a nickel based superalloy airfoil.

Figure 2:
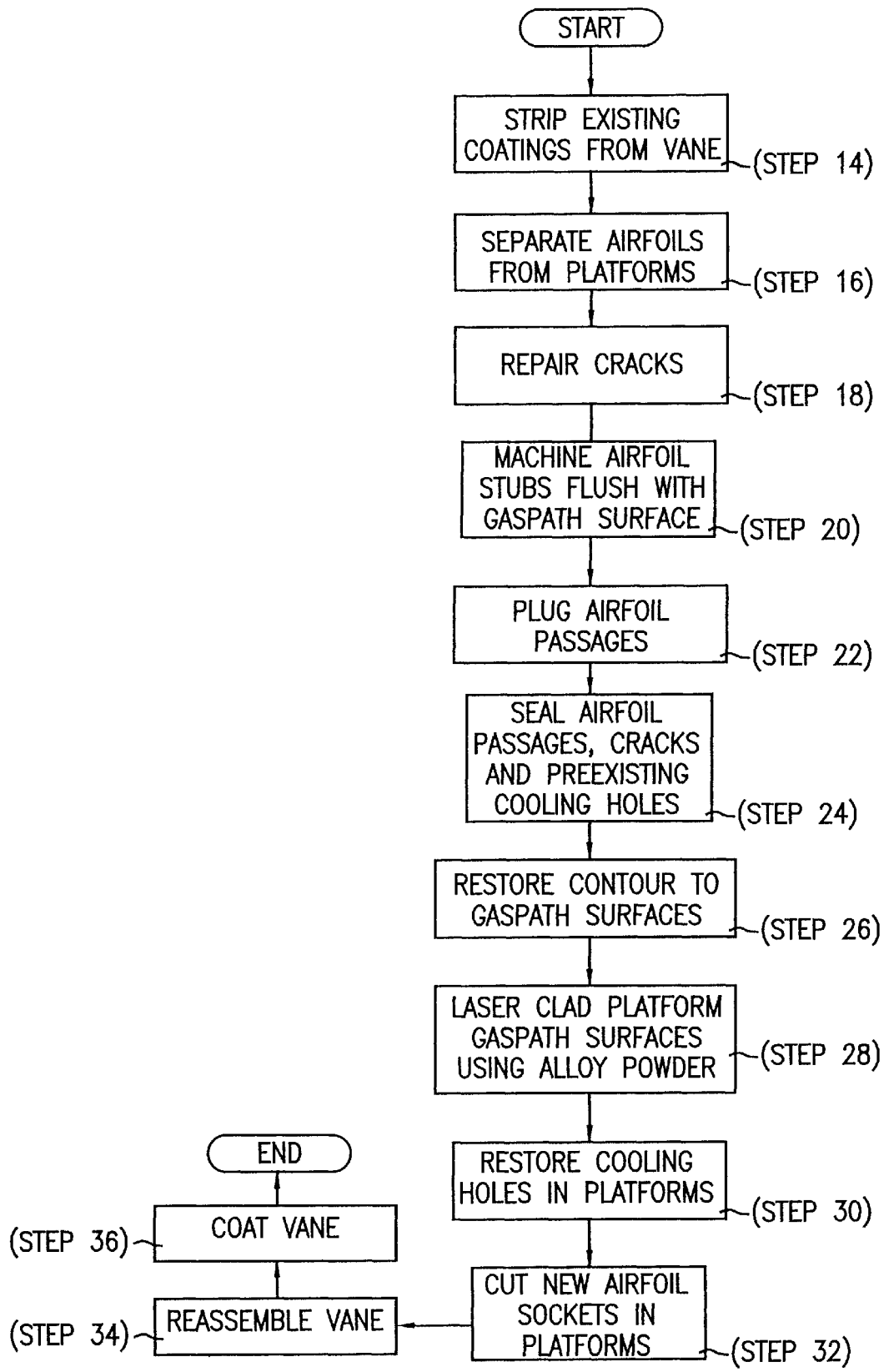
FIG. 2 is a flow chart of an airfoil replacement method of the present invention.

The vane refurbishment method of the present invention is now described with respect to the flow chart shown in FIG. 2.

Prior to refurbishment, vane 2 is measured in detail to ensure that the completed vane has substantially the same dimensions as the original. For example, the curvature in the axial and radial directions of the gaspath surfaces, i.e., the inner sides of the platforms, can be measured by comparing the contour to that of new parts, as are other platform dimensions.

A vane being refurbished is first subjected to chemical treatment to strip existing coatings from the vane (step 14). Methods for stripping these coatings are known and include for instance, a initial gritblast operation followed by immersion in a heated solution of 50% nitric/50% phosphoric acid. A subsequent gritblast after rinsing and drying the vanes may complete the process. Depending on the specific coating being removed, additional cycles in other acids may be required.

Figure 3:
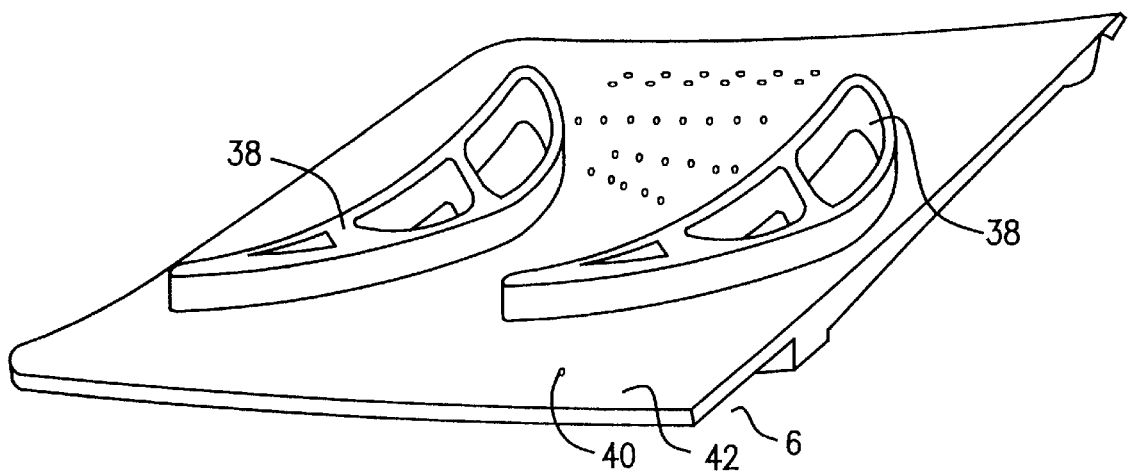
FIG. 3 is a perspective view of vane platforms with the airfoils removed to form airfoil stubs.
Figure 3:
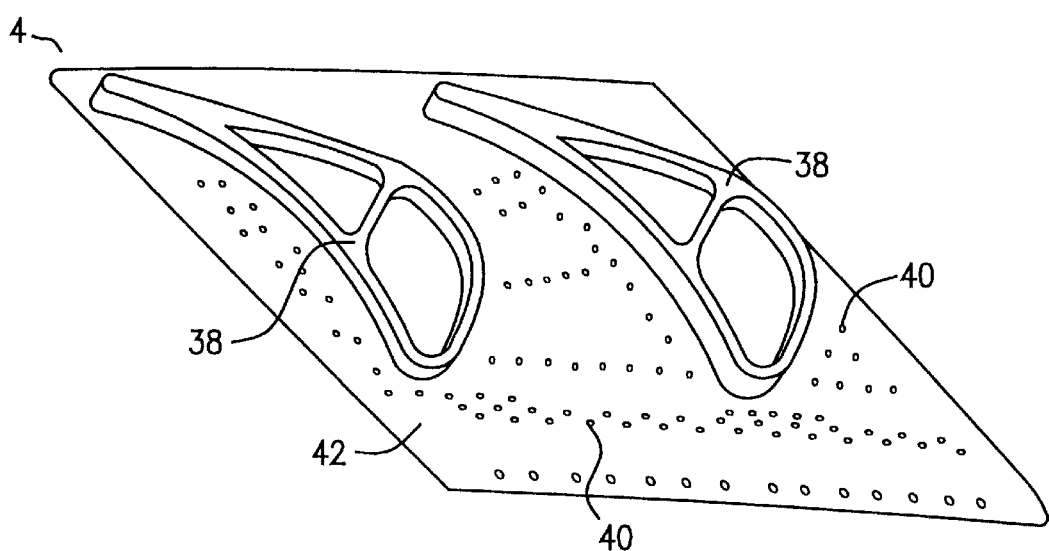

Once the vane is stripped of coatings, airfoils 8 and 10 are separated from inner platform 4 and outer platform 6 (step 16). Where the vane to be repaired is a component assembly vane, the platforms and airfoils can be separated by heating the entire assembly to a temperature sufficient to melt the braze joints. Alternatively the airfoils can be cut from the vanes leaving airfoil stubs 38 as shown in FIG. 3.

In the case where the airfoils are integrally cast with the platforms, separation is achieved by cutting airfoils 8 and 10 from vane 2 such that stubs from airfoils 8 and 10 protrude from inner platform 4 and outer platform 6. FIG. 3 shows inner platform 4 and outer platform 6 with airfoils 8 and 10 removed to form airfoil stubs 38.

It should be noted that significant cracks in the platform, including cracks along the original mate face welds can be notched, prepared and welded prior to removing airfoils 8 and 10 from vane 2 (step not shown). In addition, prior to removing airfoils 8 and 10, optionally, vane 2 can be heated and straightened to correct distortions in vane 2 caused by thermal cycling or caused by initial welding operations (step not shown).

Once airfoils 8 and 10 are removed from platforms 4 and 6, the basic repair sequence for inner platform 4 and outer platform 6 is the same. Once platforms 4 and 6 are separated, a second welding operation is performed to repair any remaining cracks in the platforms, and to plug all cooling holes 40 in platforms 4 and 6 (step 18). Known welding techniques such as TIG (tungsten inert gas) welding can be used.

Airfoil stubs 38 are then machined flush with gaspath surface 42 on platforms 4 and 6 (step 20). Machining can be accomplished, for example, by belt sanding airfoil stubs 38.

Figure 4:
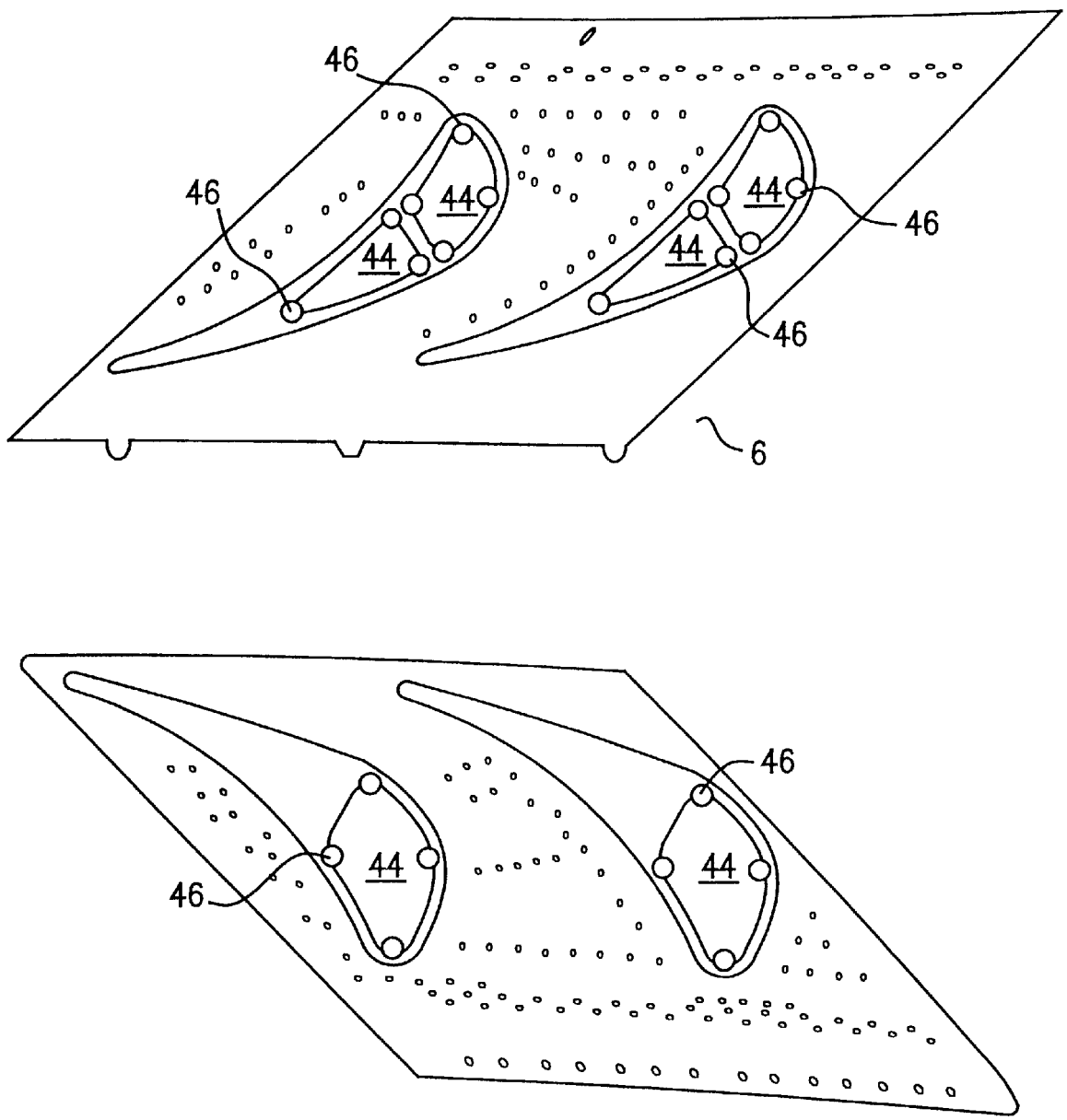
FIG. 4 is a perspective view of vane platforms having plugged platform openings.

The airfoil passages in platforms 4 and 6 are then plugged (step 22). FIG. 4 shows a perspective view of inner platform 4 and outer platform 6 with plugged platform openings. Plugs 44 are machined to fit into the corresponding airfoil openings in the platform, and tack welds 46 are used to hold plugs 44 in place. Plugs used are cut from alloy materials which are compatible to the platform base alloy, ie. the plug alloy will weld or braze uniformly with the platform base alloy. Typically the base element of the alloy for the plug is the same as that of the alloy for the platform, ie. a cobalt based superalloy. For X-40 cobalt alloy platforms L-605 cobalt alloy plugs are useful.

Platforms 4 and 6 are then processed through a vacuum cleaning cycle (step not shown) which is used to prepare most types of turbine vanes for brazing operations. If the parts are not completely clean braze will not flow properly, will not diffuse into the part and adhere properly, and will become contaminated. A suitable cleaning cycle includes first fluoride cleaning, which takes place in an atmospheric furnace wherein a chemical reaction takes place that reduces (breaks up) aluminum and titanium oxides on the vane surfaces and in exposed cracks. The next step is a hydrogen vacuum clean wherein the hydrogen gas acts to reduce chromium oxides to pure chromium. The final step is a vacuum clean cycle which pulls any residual oxides (Al, Ti, Cr) from the surface of the parts, so that the parts are finally ready for braze.

Gaspath surfaces 44 are then brazed, using known techniques, to apply a layer of braze material to seal the airfoil passages plugged by plugs 44, seal minor cracks in platforms 4 and 6, and seal cooling holes 40 to obtain a relatively smooth surface (step 24).

Platforms 4 and 6 are then machined, using known machining processes (eg. contour milling, automated beltsanding, manual beltsanding), to restore the correct, i.e., originally specified, contour to gaspath surfaces 42, and to restore platform dimensions as measured prior to the airfoil replacement operation (step 26). Gaspath contouring is easily automated using known automated machining techniques since platforms 4 and 6 are substantially smooth once airfoil stubs 36 are machined flat. Vacuum heat treatment operations can also be performed along with the manual machining steps. Nickel and cobalt based superalloys have complex, closely controlled crystal structures and microstructures. Both can be affected by the high temperatures seen during engine run, and by high temperature repair operations such as welding, brazing, vacuum cleaning, etc. At various times during the repair process specific heat treatments must be performed to restore the microstructure to original conditions, or adjust it as an interim step to facilitate other operations (such as performing an initial stress relief prior to a weld operation). In general, all of these heat treatments are performed in vacuum furnaces in order to prevent any surface oxidation or other contamination.

Platforms 4 and 6 are then placed into an appropriate fixture in preparation for laser cladding of gaspath surfaces 42 (step 28). The alloy powder mix used to clad platforms 4 and 6 is comprised of a blend of a cobalt based superalloy and a nickel based superalloy. In a preferred embodiment one or both of the cobalt based superalloy in the blend corresponds to the platform cobalt based superalloy material, and the nickel based superalloy in the blend corresponds to the replacement airfoil nickel based superalloy material. While the use of alloys in the blend which match the alloys of the platform and airfoil is preferred for compatibility purposes, it is also possible to use a different cobalt based superalloy and/or nickel based superalloy to achieve further improvement in the properties of the platform gaspath surface. The blend used is effective to provide improved mechanical properties (ie. strength, hot oxidation and corrosion resistance) to the gaspath surface of the cobalt based platform. The blend used is also effective to provide a gaspath surface for the laser clad platform which is compatible for coating purposes with the surface of the replacement nickel based superalloy airfoil, in that both surfaces can be uniformly coated. Generally the blend can comprise from 20 to 80%, preferable 40 to 60%, by weight of the nickel based superalloy and 80 to 20%, preferably 60 to 40%, by weight of the cobalt based superalloy.

In one embodiment the blend comprises equal parts by weight of the nickel based superalloy and the cobalt based superalloy. For example, platforms 4 and 6 are heated to an appropriate temperature of 1600° F., and laser clad with a powder mix of substantially equal parts 50% X40 and 50% CM186 to match the original X40 platform and CM186 replacement airfoil. The cobalt alloy X-40 has the following nominal composition: 0.45–0.55% C, 24.5–26.5% Cr, 7.0–8.0 W, 9.5–11.5% Ni with the remainder cobalt; while the nickel alloy CM186 has the following nominal composition: 5.5–5.9% Al, 0.01–0.02% B, 0.06–0.08% C, 5.7–6.3% Cr, 9.0–9.5% Co, 1.0–1.6% Hf, 0.3–0.4% Mo, 2.8–3.1% Re, 3.2–3.6% Ta, 0.5–0.9% Ti, 8.0–9.0% W, 0.004–0.010% Zr and the remainder nickel.

In the case where platforms 4 and 6 are manufactured from a cobalt based superalloy material other than X40, the laser cladding powder can be adjusted to replace the X40 portion with a different powder component corresponding to the platform base material. Similarly, the CM186 component in the laser cladding powder can be replaced with a nickel based superalloy component corresponding to the base material of airfoils 8 and 10.

Laser cladding is a welding operation which applies a surface to a base material in which the surface has mechanical properties matching those of the base material. Also, laser cladding can improve the mechanical properties of, i.e., strengthen, the surface of the base material by cladding the base material with an alloy or alloy mix having properties superior to those of the base material. In particular, gaspath surfaces 42 can be clad to improve the surface properties of platforms 4 and 6 beyond those of the platform base materials.

Figure 5:
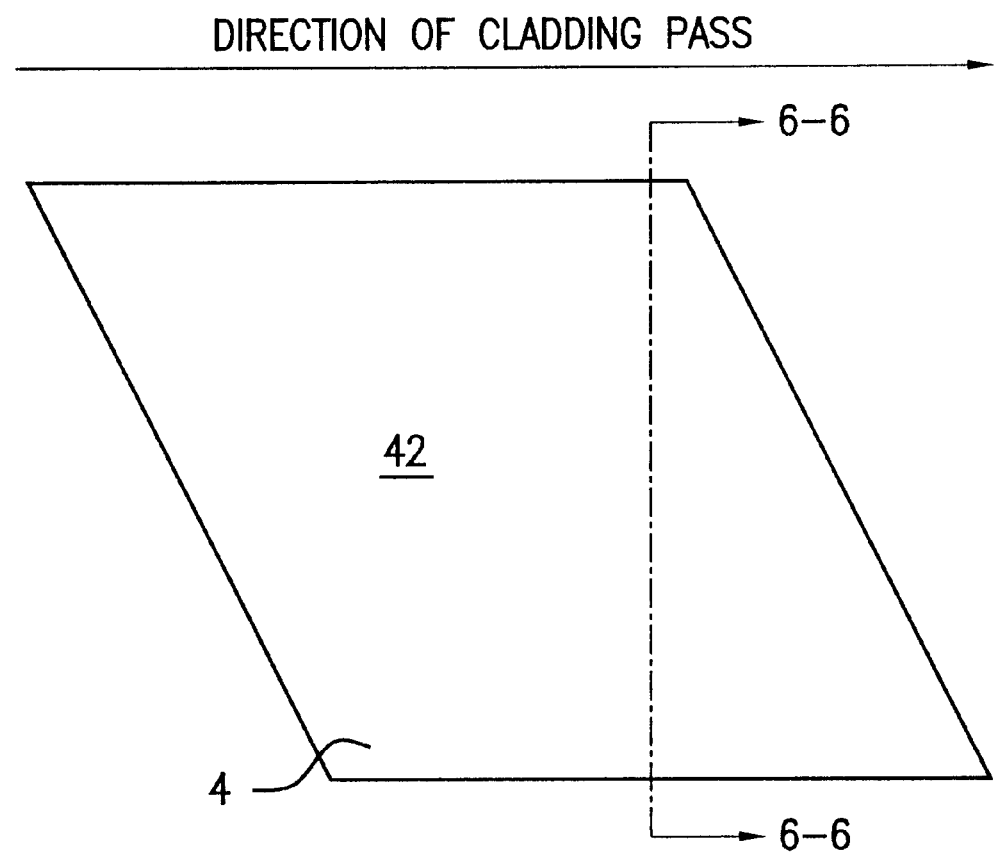
FIG. 5 is a top view of a vane platform.
Figure 6:
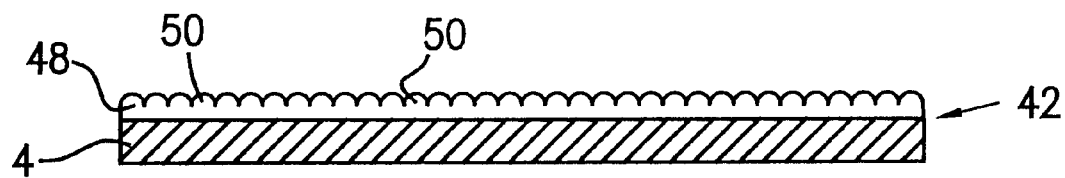
FIG. 6 is a section view of the vane platform in FIG. 5 taken through,section 6—6, showing a laser clad surface.

FIGS. 5 and 6 depict the laser cladding process as performed on platform 4, in which FIG. 5 is a top view of platform 4 and FIG. 6 is a section view thereof taken through section 6—6. As shown in FIG. 5, gaspath surface 42 is laser clad by a series of cladding passes performed sequentially as a series of rows across platform 4. At the end of each laser cladding pass, the cladding apparatus moves to an adjacent row and cladding material is applied to gaspath surface 42 on platform 4. As shown in FIG. 6, laser cladding 48 applied to gaspath surface 42 provides a series of raised areas in the form of bumps 50. Bumps 50 traverse platform 4 and are elongated in the direction of the cladding pass, i.e., row.

At this point, platforms 4 and 6 are completely sealed with little or no evidence of there having previously been airfoils attached thereto or cooling holes therethrough.

If necessary, platforms 4 and 6 can optionally receive additional vacuum heat treatments. Machining operations are then carried out to optimize material properties and ensure compliance with the original dimensions (step not shown).

Once sealed and laser clad, the clad surface is machined to match the original contour and cooling holes 40 are then restored to platforms 4 and 6. Cooling hole restoration can be accomplished using known techniques such as, for example, by laser drilling or EDM (electron discharge machining)(step 30).

Figure 7:
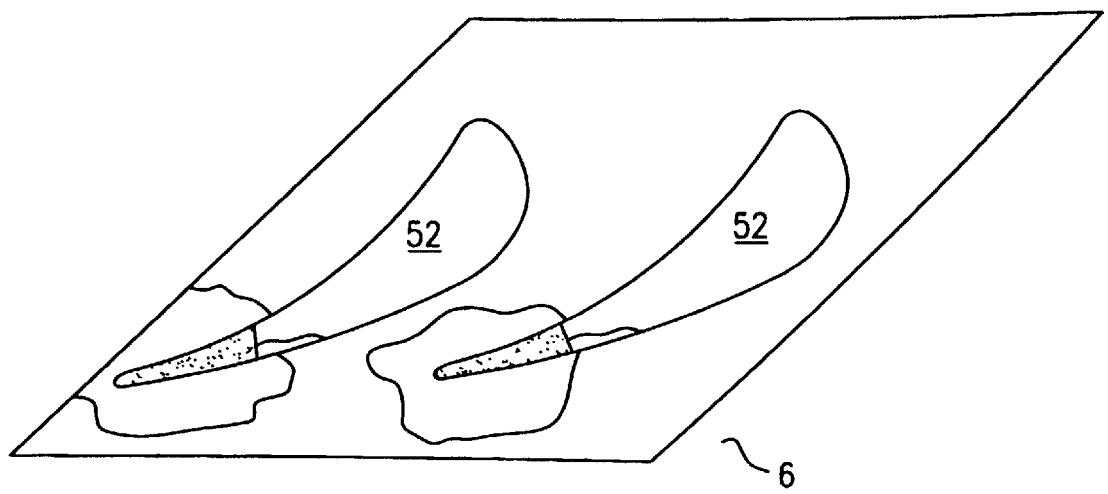
Figure 7:
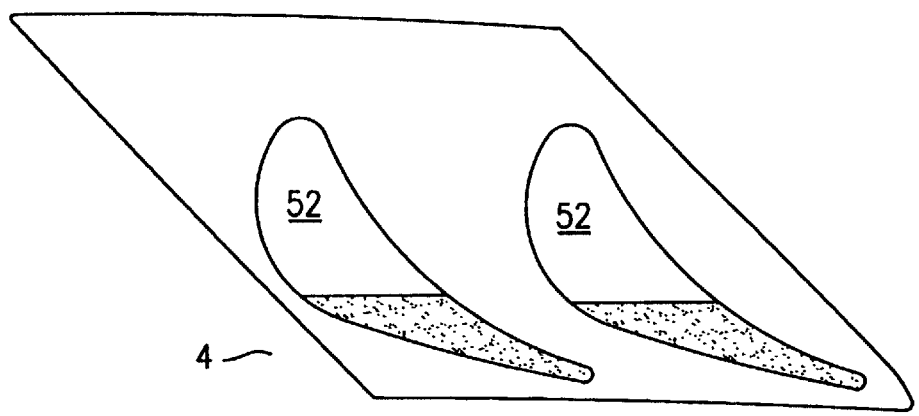

At this point, platforms 4 and 6 are ready to have airfoil sockets cut. An EDM machine is used to cut sockets for the new airfoils into precise locations on inner platform 4 and outer platform 6 (step 32). Alternatively these sockets can be cut by laser, eg. using a $CO_2$ or YAG laser. A $CO_2$ laser uses carbon dioxide gas to generate a continuous beam at a set frequency. A YAG laser emits a pulsed beam, generated by a yttrium, aluminum, garnet crystal, which is excited by flash lamps. $CO_2$ lasers are generally used for cutting or welding applications, and YAG lasers are generally used for hole drilling or cutting. FIG. 7 shows an example of platforms 4 and 6 with sockets 52 cut through.

Because airfoil sockets 52 are cut into completely sealed platforms 4 and 6, airfoil sockets 52 can be repositioned on platforms 4 and 6 in a different location than during the original manufacture of vane 2. This allows extreme flexibility such that different sized airfoils, as compared with the original airfoils, can be used, and the class area can also be adjusted to optimize the performance of vane 2 within the turbine engine.

Platforms 4 and 6 are then cleaned, and vane 2 reassembled using new cast airfoils (step 34). During vane reassembly, the new cast airfoils are placed into position using sockets 52 and tack welded into place. The airfoils are permanently sealed into position in vane 2 by brazing them into place.

Figure 8:
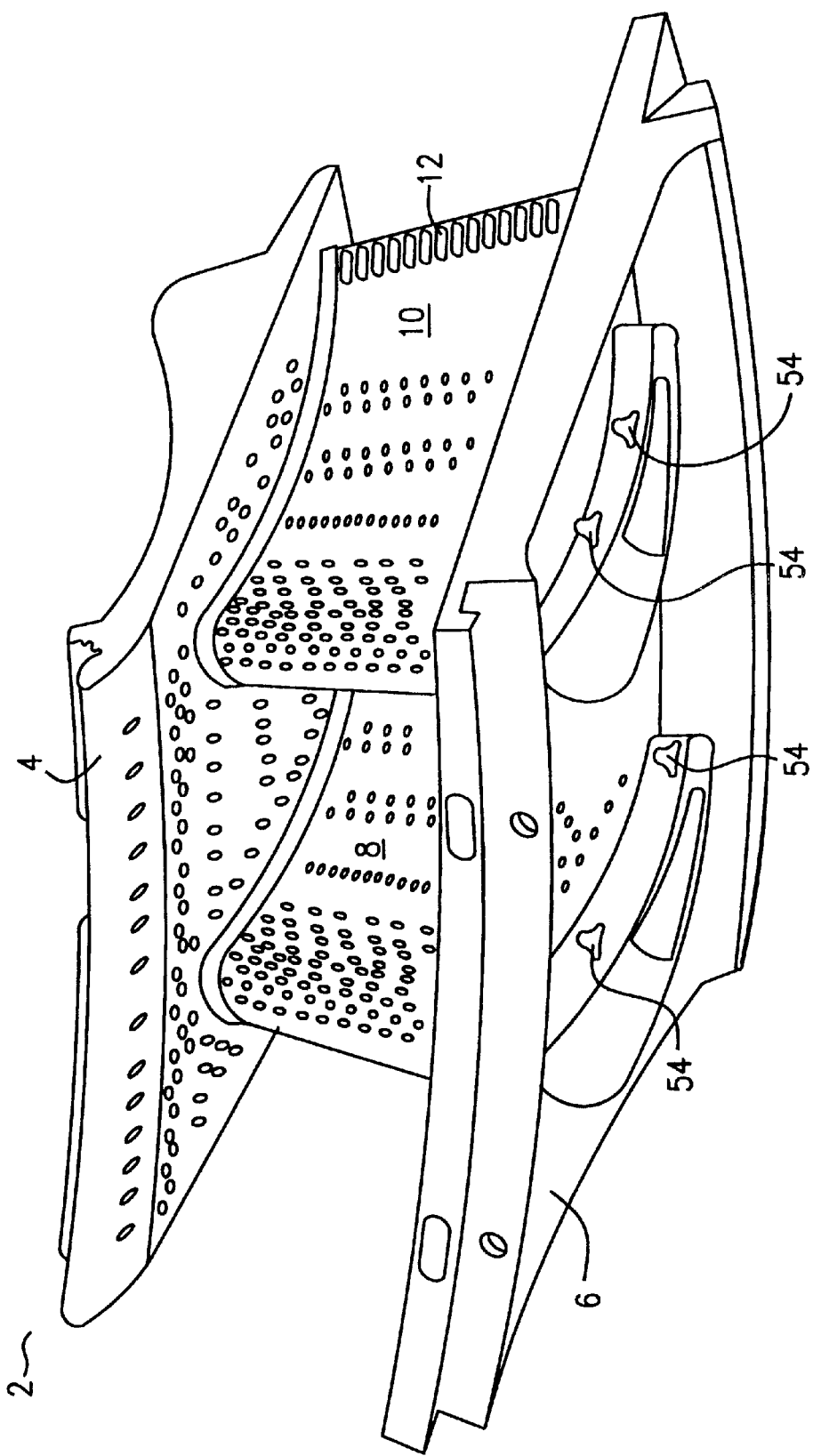
FIG. 8 is a perspective view of an assembled vane with airfoil segments welded to the platform.

FIG. 8 shows a perspective view of an assembled vane 2 after airfoil segments have been tack welded to the platforms. In particular, lead airfoil 8 and trailing airfoil 10 are shown tack welded to inner platform 4 and outer platform 6 by airfoil tack welds 48.

Final machining of vane 2 is performed to finish proper gaspath surfacing and other critical surfaces including the mate faces on each platform end, bolt flanges, top and bottom edges of the platforms, seals, etc. Gaspath surfaces 42 on reassembled vane 2 are then coated using a conventional protective coating, for example, an aluminide coating, and coating process (step 36). Cladding using the blended powder in step 28 allows the aluminide coating to be easily and uniformly applied to the replacement airfoils and the platform, thereby protecting gaspath surfaces 42.

A laser clad build-up on an X40 base material comprised of a substantially 50%/50% blend of X40/CM186 powder shows the laser clad region to be well integrated with the X40 base material. In addition, an aluminide coating is uniformly distributed on the laser clad region. As examination of laser cladding on an X40 platform after a 100 cycle air quench test was carried out. Each cycle of the quench test involved subjecting the platform to 30 minutes inside an air furnace set at 2,050° F.±25° F. and 30 minutes at ambient air temperatures, thereby simulating the operational environment of the materials in a turbine engine. Despite repeated quench (thermal) cycles, no cracking or contamination is visible in the joint between the base material and the laser clad region.

The method of the present invention provides a comprehensively refurbished high-pressure turbine vane, produced at a significantly lower cost than a new vane. The component assembly vane allows significant modification from its original form, while minimizing the time the vane is out of service.

The method of the present invention also allows airfoil castings to be upgraded without the need to upgrade the platform to a similar base material, and without fear of cracking due to different coefficients of thermal expansion between the platform base material and the airfoil base material. For example, the present invention allows a CM186 cast nickel based superalloy replacement airfoil to be used with a X40 cobalt based superalloy platform in turbine vane 2, or a CMSX4 single crystal cast nickel based superalloy airfoil to be used with a X40 cobalt based superalloy platform, or a DSR142 nickel based superalloy airfoil with a X40 cobalt based superalloy platform, or a R-80 nickel based superalloy airfoil with a X40 based superalloy cobalt platform.

Because new airfoil sockets 52 are cut into inner platform 4 and outer platform 6 to position the replacement airfoils, the class area can be changed without modifying the contour of the airfoils by adding or removing material from the airfoils as required in prior art vane repair methods.

Also, because the present invention removes the airfoil stubs and closes platform passages, gaspath surface contouring operations can be easily automated, thereby reducing cost and the time necessary to perform the repair on vane 2. Subsequent airfoil replacement is also simplified, thereby reducing cost and out of service time for vane 2 because airfoil replacement on a component assembly vane is less complicated than performing the replacement on an integrated cast assembly. This is particularly the case because vane 2, once repaired using the method of the present invention, converts an integrated cast assembly to a component assembly. Of course, the vane undergoing repair using the method of the present invention can be a component assembly.

Although the present invention has been described in relation to particular embodiments thereof, many other variations and modifications and other uses will become apparent to those skilled in the art. Therefore, the present invention is not limited by the specific disclosure herein.

What is claimed is:

1. A method of refurbishing a turbine vane, the turbine vane having at least one platform and at least one airfoil, the method including replacing the at least one airfoil with at least one replacement airfoil wherein the at least one platform comprises a first cobalt based superalloy and the at least one replacement airfoil comprises a first nickel based superalloy comprising the steps of:
   separating the at least one platform from the at least one airfoil;
   laser cladding the at least one platform with a blend of a second nickel based superalloy and a second cobalt based superalloy; and
   reassembling the vane from the at least one laser clad platform and at least one replacement airfoil.

2. The method of claim 1, wherein the blend comprises 20 to 80% by weight of the second cobalt based superalloy and 80 to 20% by weight of the second nickel based superalloy.

3. The method of claim 2, wherein the blend comprises 40 to 60% by weight of the second cobalt based superalloy and 60 to 40% by weight of the second nickel based superalloy.

4. The method of claim 3 wherein the blend comprises approximately equal amounts of the second cobalt based superalloy and the second nickel based superalloy.

5. The method of claim 2 wherein the second cobalt based superalloy of the blend is the same composition as the first cobalt based superalloy of the at least one platform.

6. The method of claim 5 wherein the second nickel based superalloy of the blend is the same composition as the first nickel based superalloy of the at least one replacement airfoil.

7. The method of claim 2 herein the blend is effective to provide a gaspath surface for the at least one laser clad platform which is compatible for coating purposes with the surface of the at least one replacement airfoil.

8. The method of claim 2 wherein the blend is effective to provide a gaspath surface for the laser clad platform with improved mechanical properties.

9. The method of claim 2 wherein the first cobalt based superalloy is X40.

10. The method of claim 9, wherein the first nickel based superalloy is directionally solidified CM186.

11. The method of claim 10, wherein the second cobalt based superalloy is X40 and the second nickel based superalloy is CM186.

12. The method of claim 1, further comprising the step of coating gaspath surfaces on the reassembled vane.

13. The method of claim 12, wherein the coating is an aluminide coating.

14. The method of claim 1, wherein the separating step includes the steps of:
    cutting each airfoil from the at least one platform to form a corresponding stub on each of the at least one platforms; and
    machining each of the stubs flush with a surface of a corresponding at least one platform.

15. The method of claim 1, further comprising the steps of:
    plugging openings in the at least one platform, the openings including at least one airfoil opening; and
    brazing the at least one platform.

16. The method of claim 15, wherein the plugging step includes the steps of:
    machining a plug from a blank, the blank being a material compatible to the at least one platform and being formed to substantially fill a corresponding airfoil opening; and
    welding the plug into the corresponding airfoil opening on the at least one platform.

17. The method of claim 1, further comprising the steps of:
    sealing the at least one platform to form a corresponding at least one sealed platform; and
    restoring cooling holes to the at least one sealed platform.

18. A method of repairing a turbine vane, the turbine vane having at least one platform and at least one airfoil, the at least one platform having an opening, the method including replacing the at least one airfoil with at least one replacement airfoil wherein the at lest one platform comprises a first cobalt based superalloy and the at least one replacement airfoil comprises a first nickel based superalloy, comprising the steps of:
    separating the at least one platform from the at least one airfoil;
    restoring a gaspath surface to the at least one platform;
    laser cladding the at least one platform with a blend of a second nickel based superalloy and a second cobalt based superalloy;
    cutting at least one airfoil socket into the at least one platform; and
    reassembling the vane from the at least one platform and at least one replacement airfoil, the at least one replacement airfoil being coupled with the at least one airfoil socket.

19. The method of claim 18, wherein the restoration step includes contouring the gaspath surface using an automated machine operation.

20. A method of repairing a turbine vane, the turbine vane having at least one platform and a plurality of airfoils, a distance between two of the plurality of airfoils defining a first class area, the at least one platform having openings corresponding to a quantity of airfoils, the method including replacing the at least one airfoil with at least one replacement airfoil wherein the at lest one platform comprises a first cobalt based superalloy and the at least one replacement airfoil comprises a first nickel based superalloy, comprising the steps of:
    separating the at least one platform from the plurality of airfoils;

sealing the openings in the at least one platform;

laser cladding the at least one platform with a blend of a second nickel based superalloy and a second cobalt based superalloy;

cutting a plurality of airfoil sockets into the at least one platform, the plurality of airfoil sockets being cut at a location different from a corresponding opening; and reassembling the vane from the at least one platform and the plurality of replacement airfoils, each of the plurality of replacement airfoils being coupled with a respective airfoil socket.

21. The method of claim 20, wherein the reassembled vane comprises a second class area different from the first class area.

22. The method of claim 20, wherein the first cobalt based superalloy of the at least one platform is the same composition as the second cobalt based superalloy of the blend and, the first nickel based superalloy of the at least one replacement airfoil is the same composition as the second nickel based superalloy of the blend.

23. The method of claim 22, wherein the first cobalt based superalloy is X40 and the first nickel based superalloy is CM186.

24. The method of claim 20, wherein the sealing step is accomplished by brazing a third material to the at least one platform.

25. The method of claim 23, wherein the second cobalt based superalloy is the same composition as the first cobalt based superalloy and the second nickel based superalloy is the same composition as the first nickel based superalloy.

* * * * *